Figure 1:
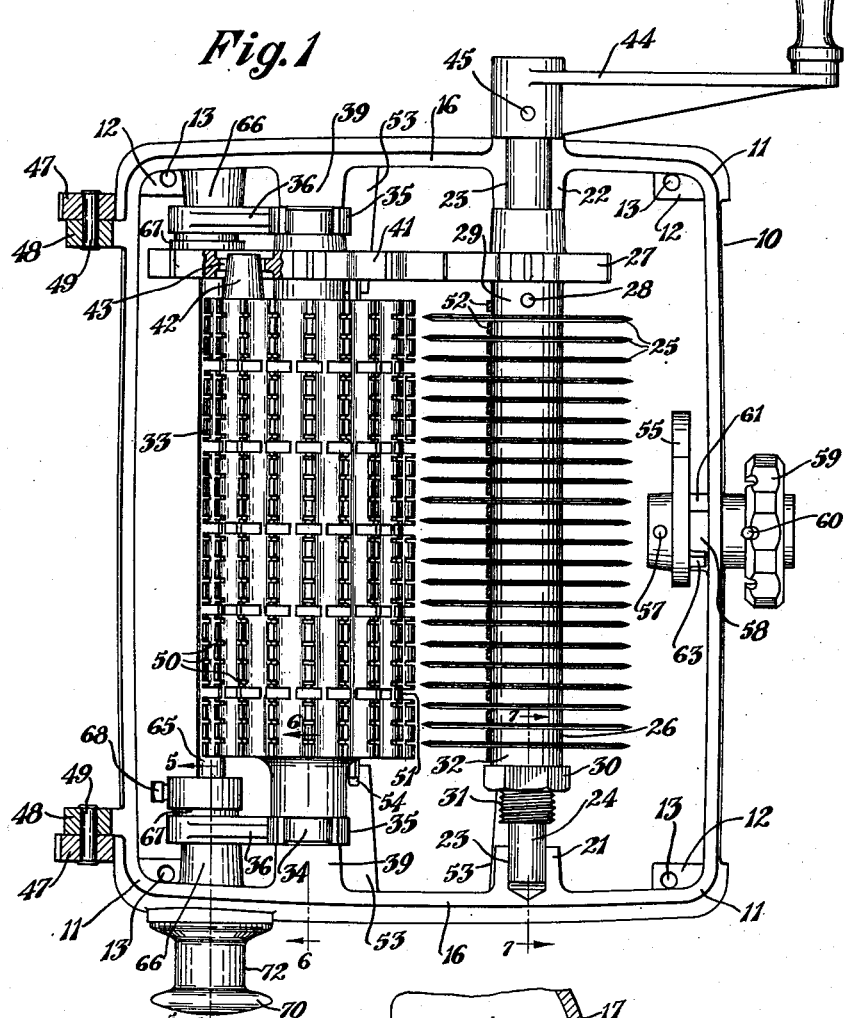

Sept. 27, 1938.  A. J. GURNEY  2,131,397
STEAK SLICING AND DICING MACHINE
Filed Sept. 11, 1935  2 Sheets-Sheet 2
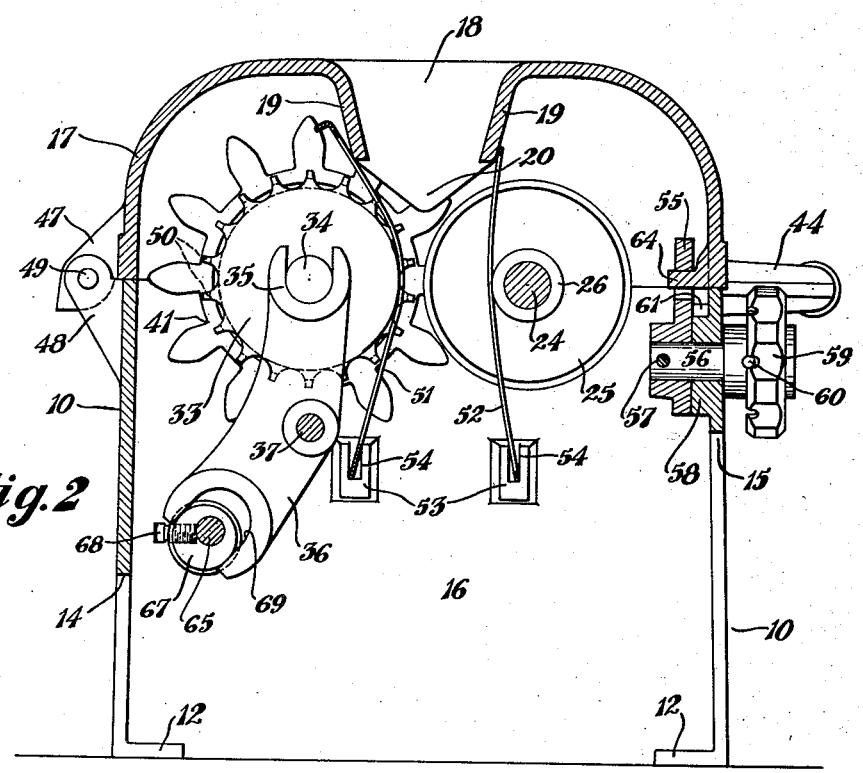
Fig. 2
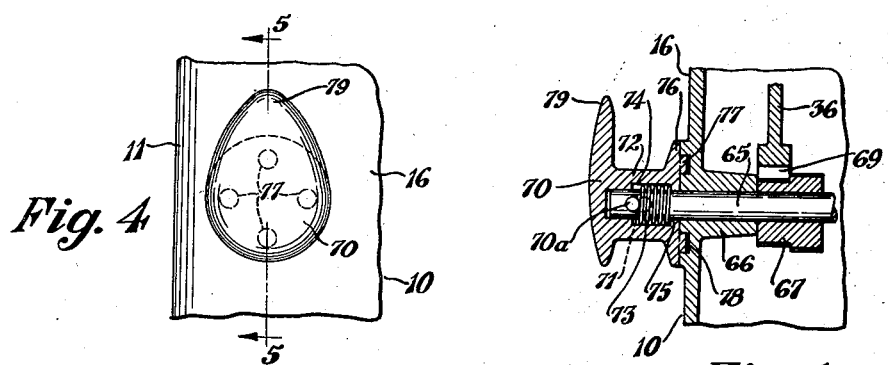
Fig. 4
Fig. 5
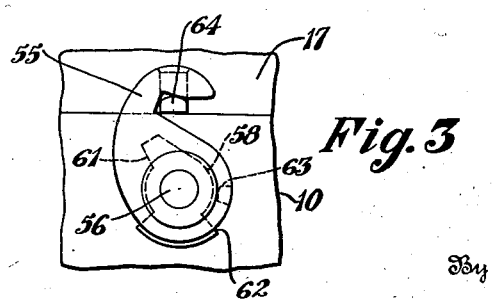
Fig. 3
Inventor
A. J. Gurney
By Frease and Bishop
Attorneys Patented Sept. 27, 1938

2,131,397

UNITED STATES PATENT OFFICE 2,131,397

STEAK SLICING AND DICING MACHINE

Albert J. Gurney, Canton, Ohio, assignor to The American Mine Door Company, Canton, Ohio, a corporation of Ohio Application September 11, 1935, Serial No. 40,085

9 Claims. (Cl. 17—26)

The invention relates to machines for slicing or dicing the surfaces of steaks and similar cuts of meat in order to sever the fibers and open the tissues of the meat so that the same may be made tender and juicy when broiled, fried or otherwise cooked, and more especially to improvements upon the general type of machine disclosed in my prior Patent No. 1,979,464 granted November 6, 1934.

Animal flesh is composed of tissues and fibers which bind the tissues together, making the meat tough and hard to chew. These tissues and fibers become tougher in some parts of the meat than in others, making it practically impossible to broil or fry such cuts so as to make them edible.

My prior patent, above referred to, discloses a machine comprising a frame or housing in which is mounted a plurality of disk knives arranged to cooperate with a longitudinally corrugated or fluted roll having kerfs or notches in the high points of the corrugations to receive the cutting edges of the disk knives, means being provided for adjusting the cutting roll and disk knives toward or from each other and for removing the same from the housing or frame for the purpose of cleaning or repairing the machine.

The object of the present improvement is to generally improve and simplify the construction of steak slicing and dicing machines of the character referred to.

A further object is to provide such a machine in which the parts may be more quickly and easily removed for cleaning.

A further object is to provide means for more quickly, easily and accurately adjusting the machine so as to vary the depth of the cuts in the meat.

A still further object is to provide a housing for the machine having a hinged cover which may be easily opened to permit removal of the plurality of disk knives and the corrugated roll.

Another object is to provide an easily operated locking or latching means for locking the cover in closed position.

A further object of the improvement is to provide an improved means for holding the strippers in position relative to the gang of disk knives and the corrugated roller.

The above objects, together with others which will be apparent from the drawings and following description, or which may be hereinafter pointed out, may be attained by constructing the improved machine in the manner illustrated in the accompanying drawings, in which Figure 1 is a top plan view of a steak slicing and dicing machine embodying the invention, showing the hinged cover removed;

Fig. 2, a transverse vertical section through the machine;

Fig. 3, a fragmentary view of a portion of the interior of the housing and hinged cover showing the locking or latching means for the cover;

Fig. 4, a fragmentary elevation of a portion of the housing showing the knob for adjusting the corrugated roll relative to the gang of disk knives;

Fig. 5, a transverse section taken as on the lines 5—5, Figs. 1 and 4;

Fig. 6, a fragmentary sectional view through one of the bearings for the corrugated roll, taken as on the line 6—6, Fig. 1; and Fig. 7, a similar view through one of the bearings for the gang of disk knives, taken as on the line 7—7, Fig. 1.

Similar numerals refer to similar parts throughout the drawings.

The housing for the improved machine, indicated generally at 10, may be substantially rectangular in plan as shown in Fig. 1, the corners being preferably rounded as at 11 and inturned lugs 12 being formed at the corners providing feet for supporting the housing upon a table, counter or the like to which it may be permanently attached as by screws or nails located through the apertures 13 formed in the feet 12.

The lower portions of the side walls of the housing 10 may be cut out as at 14 and 15 to permit the steaks or other meat cuts to be easily removed from the housing after they have been passed through the machine for tendering. The end walls 16 of the housing, however, may be unbroken as shown in the drawings so as to entirely enclose both ends of the housing.

The cover 17 may be of dome shape and is so shaped in plan as to fit tightly upon the upper edge of the housing 10. A central elongated opening 18 is formed in the cover, this opening being of substantially the length of the corrugated roll and gang of disk knives to be later described and depending flanges 19 may be provided at the side edges of said opening, a depending tapered flange 20, of considerably greater depth than the side flanges 19, being formed at each end of the opening 18.

Half-round bosses 21 and 22 are formed on the inner sides of the end walls 16 opposed to each other and at one side of the longitudinal center line of the housing. These bosses have half-round bearing grooves 23 formed therein, within which are journaled the end portions of the shaft 24 which has fixed thereon a spaced plurality of disk knives 25 held in spaced relation upon the shaft as by the spacing collars 26.

A pinion 27 is fixed upon the shaft as by a pin 28 located through the hub 29 thereof which contacts with the endmost disk knife at that end of the shaft, while a nut 30 may be mounted upon the threaded portion 31 at the opposite end portion of the shaft for clamping the disk knives and spacing collars between said hub and the clamping collar 32.

A longitudinally corrugated or fluted roll 33 is fixed upon the shaft 34 which is journaled at opposite ends in the open bearings 35 formed upon the upper ends of the adjustable bearing arms 36 which are pivoted midway of their ends upon the stub shafts 37 carried by the lugs 38 formed upon the adjacent end walls of the housing.

Inwardly disposed, half-round bosses 39 are formed at the upper edges of the end walls 16 and similar half-round lugs 40 are formed at the lower edges of the cover 17 and adapted to register with the bosses 39 and together therewith form guides across the flat ends of which the open bearing portions 35 may be slidably moved, retaining the roll 33 against longitudinal movement.

A gear 41 is mounted upon the shaft 34 and meshes with the pinion 27. This gear may be fixed against rotation on the shaft 34 by means of a longitudinal eccentric stud or pin 42 upon the adjacent end of the corrugated roll 33 engaging an eccentric aperture 43 in the gear, thus permitting the gear to be slidably removed from the shaft 34 to provide for easily cleaning the roll when the same is removed from the machine.

A crank 44 may be fixed upon the shaft 24 as by a pin 45 located through the hub of the crank, for the purpose of rotating the plurality of disk knives and corrugated roll in unison. Hollow half-round bearing lugs 46 may be formed at the lower edge of the cover 17 to register with the lugs 21 and 22 at the upper edges of the end walls of the housing and together therewith form bearings for the journal portions of the shaft 24 when the cover is in closed position. The cover may be hingedly connected to the housing as by the hinge ears 47 at one side of the cover, hinge ears 48 upon the adjacent side wall of the housing and the hinge pintles 49 located through each pair of ears.

The ribs or high points upon the corrugated or fluted roll 33 may be provided with kerfs or notches 50 located in position to register with the disk knives 25 and receive the peripheral portions thereof when the roll is adjusted sufficiently close to the knives.

In order to prevent the meat from winding around the roll or the disk knives, strippers 51 and 52 of the character illustrated and described in my prior patent above referred to, may be provided to cooperate with the roll and disk knives respectively. For the purpose of more securely holding the strippers in place, bosses 53 are formed upon the end walls 16 of the housing and provided with the vertical elongated open slots 54 which receive the lower corners of the strippers and hold them substantially in upright position.

With this construction the strippers are held substantially in their normal position when the cover is raised so as to permit the cover to be again closed without the necessity of first manually moving the strippers into position to permit the flanges 19 of the cover to be inserted between the strippers.

The cover 17 may be locked or latched in closed position by means of a latch including a hook 55 fixed upon a short shaft 56 as by a pin 57, the shaft being journaled through a boss 58 in the adjacent side wall of the housing 10 and having a knob 59 fixed to its outer end as by a pin 60. The boss 58 may be of the shape best shown in Fig. 3, having an angular lug 61 on its upper side and an angular lug 62 on its lower side for contact with the lug 63 on the hook 55 to limit the opening and closing movement of the latch. The hook 55 is adapted to engage a lug 64 upon the inside of the cover 17 as shown in Figs. 2 and 3, for the purpose of locking or latching the cover in closed position.

For the purpose of adjusting the corrugated roll 33 toward or from the plurality of disk knives, means is provided for acting upon the lower ends of the lever arms 36 to swing the same upon their pivots. This means may include a shaft 65 journaled through suitable bearing bosses 66 in the end walls 16 of the housing.

Mounted upon the shaft 65 is a pair of eccentrics 67 fixed upon the shaft as by set screws 68 and located within the slots 69 in the lower ends of the lever arms 36 whereby a rotation of the shaft will cause the eccentrics 67 to swing the lever arms upon their pivots 37.

For the purpose of manually rotating the shaft to adjust the position of the roll 33, a knob 70 may be mounted upon one end of the shaft 65, this knob being slidably mounted upon the shaft by means of a pin 70a located through the shaft and through slots 71 in the hub portion 72 of the knob, a coil spring 73 being located in a suitable axial socket 74 within said hub portion and bearing at one end against the pin 70a and at its other end against the inturned flange 75 at the inner end of the knob.

An outturned flange 76 may be formed at the inner end of the knob and provided with one or more studs 77 adapted to selectively engage sockets 78 in the adjacent end wall 16 of the housing to hold the knob in adjusted position. One side of the knob may be extended outward or elongated as at 79, forming an indicator or pointer to assist in quick adjustment of the roll 33.

From the above description and the accompanying drawings, it will be evident that the improved machine is normally entirely enclosed so as to prevent possibility of injury to the operator, while at the same time the cover may be easily and quickly unlatched and opened to give access to the interior of the machine, and the plurality of disk knives and corrugated roll may be easily and quickly lifted out of the machine for cleaning or repairs and may be as easily and readily replaced in the machine and the cover closed and latched ready for operation.

It will also be seen that the means for adjusting the corrugated roll relative to the plurality of disk knives is considerably simplified and is more accurate and is so constructed that both ends of the corrugated roll shaft are uniformly adjusted so as to always maintain the corrugated roll exactly parallel to the axis of the gang of disk knives.

I claim:

1. A meat tendering machine including a pair of rotatable members comprising a spaced plurality of disk knives and a roll located adjacent to the knives, fixed bearings in which one of said rotatable members is journaled, movable bearings in which the other member is journaled, a rotatable shaft, eccentrics fixed upon said shaft and associated with the movable bearings, and means for rotating said shaft to uniformly adjust the movable bearings relative to the fixed bearings.

2. A meat tendering machine including a pair of rotatable members comprising a spaced plurality of disk knives and a roll located adjacent to the knives, fixed bearings in which one of said rotatable members is journaled, pivoted bearings in which the other member is journaled, a rotatable shaft, eccentrics fixed upon said shaft and associated with the pivoted bearings, and means for rotating said shaft to uniformly adjust the pivoted bearings relative to the fixed bearings.

3. A meat tendering machine including a pair of rotatable members comprising a spaced plurality of disk knives and a roll located adjacent to the knives, fixed bearings in which one of said rotatable members is journaled, a pair of lever arms pivoted intermediate their ends, bearings in one end of the arms in which the other member is journaled, a rotatable shaft, means fixed upon said shaft and associated with the other end of the arms, and means for rotating said shaft for simultaneously swinging the arms upon their pivots to uniformly adjust the last named bearings relative to the fixed bearings and to hold the movable bearings in adjusted position.

4. A meat tendering machine including a pair of rotatable members comprising a spaced plurality of disk knives and a roll located adjacent to the knives, fixed bearings in which one of said rotatable members is journaled, a pair of lever arms pivoted intermediate their ends, bearings in one end of the arms in which the other member is journaled, the other end of said arms being slotted, eccentrics engaging the slotted ends of the arms, and means for simultaneously operating said eccentrics to uniformly adjust the last named bearings relative to the fixed bearings.

5. A meat tendering machine including a housing, fixed bearings in the housing, a pair of rotatable members comprising a spaced plurality of disk knives and a roll located adjacent to the knives, one of said rotatable members being journaled in said fixed bearings, a pair of lever arms pivoted intermediate their ends to opposite ends of the housing, bearings in the upper ends of said arms in which the other of said members is journaled, the lower ends of said arms having slots therein, a rotatable shaft journaled in the housing, eccentrics upon said shaft engaging said slots, a knob for rotating the shaft and means for holding the knob in adjusted positions.

6. A meat tendering machine including a housing having end walls provided with opposed open bearings at their upper edges, a shaft journaled in said bearings and carrying a spaced plurality of disk knives, means for rotating said shaft, levers fulcrumed upon the inner sides of said end walls, movable open bearings carried by said levers, a roll journaled in said movable bearings, cooperating means upon the roll and shaft for driving the roll, a removable cover for the housing, and opposed open bearings in the lower edge of the cover adapted to register with the bearings on the housing.

7. A meat tendering machine including a housing having end walls provided with opposed open bearings at their upper edges, a shaft journaled in said bearings and carrying a spaced plurality of disk knives, means for rotating said shaft, levers fulcrumed upon the inner sides of said end walls, movable open bearings carried by said levers, a roll journaled in said movable bearings, inwardly disposed bosses upon the housing forming guides for the movable bearings, cooperating means upon the roll and shaft for driving the roll, a removable cover for the housing, and opposed open bearings in the lower edge of the cover adapted to register with the bearings on the housing.

8. A meat tendering machine including a pair of rotatable members comprising a spaced plurality of disk knives and a roll located adjacent to the knives, fixed bearings in which one of said rotatable members is journaled, a pair of lever arms pivoted intermediate their ends, bearings in one end of the arms in which the other member is journaled, and eccentrics associated with the other end of the arms for simultaneously swinging the arms upon their pivots to uniformly adjust the last named bearings relative to the fixed bearings.

9. A meat tendering machine including a pair of rotatable members comprising a spaced plurality of disk knives and a roll located adjacent to the knives, fixed bearings in which one of said rotatable members is journaled, a pair of lever arms pivoted intermediate their ends, bearings in one end of the arms in which the other member is journaled, a rotatable shaft, eccentrics fixed upon said shaft and associated with the other end of the lever arms, and means for rotating said shaft to uniformly adjust the pivoted bearings relative to the fixed bearings.

ALBERT J. GURNEY.